April 7, 1925.  
H. T. OLSON  
PIPE LIFTER  
Filed May 20, 1924
1,532,150
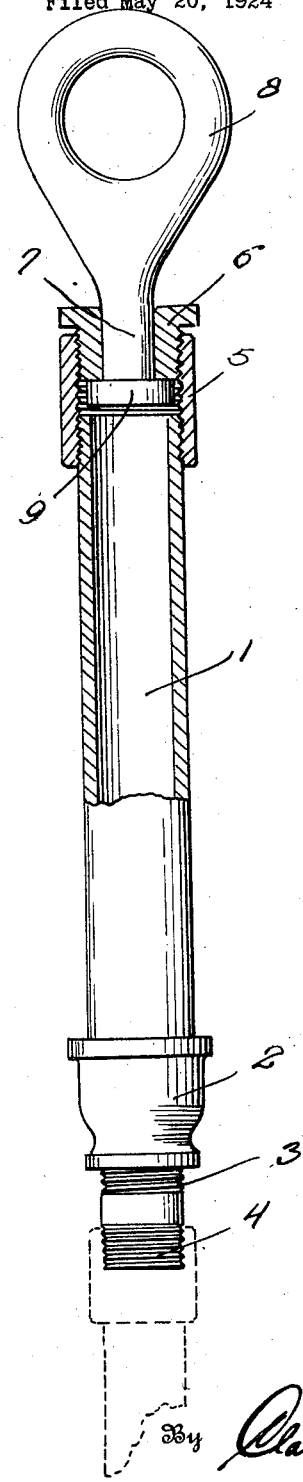
Harald T. Olson,  
Inventor
By Clarence A. O'Brien  
Attorney Patented Apr. 7, 1925.

1,532,150

UNITED STATES PATENT OFFICE.

HARALD T. OLSON, OF ELSIE, NEBRASKA.

PIPE LIFTER.

Application filed May 20, 1924. Serial No. 714,674.

*To all whom it may concern:*

Be it known that I, HARALD T. OLSON, a citizen of the United States, residing at Elsie, in the county of Perkins and State of Nebraska, have invented certain new and useful Improvements in Pipe Lifters, of which the following is a specification.

This invention relates to new and useful improvements in means for handling pipes in connection with oil wells, and has for its principal object to provide a simple and efficient device, which may be readily and easily attached to a pipe, for the purpose of extracting the same from the well, or inserting the same therein.

A further object of the invention is to provide a pipe lifter of the above mentioned character, which is of such a construction as to enable the pipe to which the device is to be connected to be lifted in a substantially straight manner, the lifter being positively connected to the pipe so as to prevent the same from becoming disengaged therefrom.

A further object of the invention is to provide a pipe lifter of the above mentioned character, which will not bend or otherwise deface or disfigure the pipe, while the same is being handled.

A still further object is to provide a pipe lifter of the above mentioned character, which is simple in construction, inexpensive, strong and durable, and further well adapted for the purposes for which it is designated.

Other objects and advantages of this invention will become apparent during the course of the following description.

In the accompanying drawing, forming a part of this specification, and in which like numerals designate like parts throughout the same:

The figure illustrates my improved pipe lifter, parts thereof being shown in section, and the pipe engaging means being shown in side elevation.

In the drawing, wherein for the purpose of illustration is shown the preferred embodiment of my invention, the numeral 1 designates an elongated tubular shank, the ends of which are externally threaded, for the purposes hereinafter more fully described. Adapted to be movably supported on the lower threaded end of the shank 1 is the reducing nipple or collar 2. This nipple is threaded and is adapted to receive and support the upper threaded end of the short tubular scetion of pipe 3, the opposite end of the short tubular section of pipe being threaded as illustrated at 4, for engagement with the upper threaded end of the pipe that is to be lifted from the oil well. The tubular section of pipe 3 provides what I term as the pipe engaging member and by providing the nipple 2, the proper size pipe engaging member may be removably associated therewith.

The upper threaded end of the shank 1 is adapted to receive the sleeve 5 and a packing nut 6 is threaded in the upper portion of the sleeve and furthermore supports the reduced end 7 of the swivel 8 therein. The reduced end of the swivel is provided with the end 9, which is disposed between the upper edge of the shank 1 and the packing nut 6, in the manner shown, in the drawing, and furthermore spaced therebetween to facilitate the turning of the swivel member 8.

In use, the pipe engaging member 4 is threaded into the upper end of the pipe, which is to be lifted, and the swivel is attached to a suitable operating cable or the like, and by exerting a pull on the operating means, a straight and direct pull is exerted on the shank and the pipe engaging member carried thereby, causing the pipe to be lifted upwardly in a straight direction, so as to prevent the bending of the pipe.

It will thus be seen, from the foregoing description, that a pipe lifting device has been provided, which will effectively and positively lift a pipe from a well, without having to employ the usual grapple hooks, which ordinarily is used for the purpose of removing a pipe from a well, and at this time, the grapple hooks will become disengaged from the sides of the pipes around which the same are placed.

The simplicity of my device enables the same to be readily assembled or disassembled as is desired, and furthermore will be strong and durable, yet inexpensive.

While I have shown the preferred embodiment of my invention, it is to be understood that various changes in the size, shape, and arrangement of parts, may be resorted to, without departing from the spirit of the invention and the scope of the appended claim.

Having thus described my invention, what I claim is:

A pipe lifter comprising a shank, a reducing nipple threaded on the lower end thereof, a pipe engaging member carried by the reducing nipple, a sleeve threaded on the upper end, a packing nut threaded into the upper end of said sleeve and spaced from the upper edge of the shank, a swivel member, the lower end thereof being reduced and extending through said packing nut, and a head on the reduced end of the swivel member, disposed between the packing nut and the upper end of the shank.

In testimony whereof I affix my signature.

HARALD T. OLSON.